United States Patent
Nagata et al.

(10) Patent No.: US 9,629,141 B2
(45) Date of Patent: Apr. 18, 2017

(54) RADIO COMMUNICATION SYSTEM, RADIO BASE STATION APPARATUS AND RETRANSMISSION CONTROL METHOD

(71) Applicant: NTT DOCOMO, INC., Tokyo (JP)

(72) Inventors: Satoshi Nagata, Tokyo (JP); Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/417,799

(22) PCT Filed: Jun. 18, 2013

(86) PCT No.: PCT/JP2013/066695
§ 371 (c)(1),
(2) Date: Jan. 28, 2015

(87) PCT Pub. No.: WO2014/021009
PCT Pub. Date: Feb. 6, 2014

(65) Prior Publication Data
US 2015/0304992 A1    Oct. 22, 2015

(30) Foreign Application Priority Data

Jul. 31, 2012 (JP) .................. 2012-170258

(51) Int. Cl.
*H04W 4/00* (2009.01)
*H04W 72/04* (2009.01)
(Continued)

(52) U.S. Cl.
CPC .......... *H04W 72/042* (2013.01); *H04B 7/024* (2013.01); *H04L 1/1887* (2013.01); *H04W 88/02* (2013.01); *H04W 88/08* (2013.01)

(58) Field of Classification Search
USPC .................. 370/329, 330, 331, 333, 338
See application file for complete search history.

(56) References Cited

U.S. PATENT DOCUMENTS

| | | | |
|---|---|---|---|
| 2011/0199975 A1 | 8/2011 | Wu | |
| 2012/0163357 A1* | 6/2012 | Won | H04L 1/1671 370/338 |

(Continued)

FOREIGN PATENT DOCUMENTS

| | | |
|---|---|---|
| JP | 2011-160121 A | 8/2011 |
| WO | 2010/049970 A1 | 5/2010 |
| WO | 2011/155255 A1 | 12/2011 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

(Continued)

*Primary Examiner* — Zewdu A Beyen
(74) *Attorney, Agent, or Firm* — Osha Liang LLP (57) ABSTRACT

A radio communication system, a radio base station apparatus and a retransmission control method is provided that can realize a highly efficient retransmission control method in a CoMP environment. The retransmission control method is a retransmission control method in a radio communication system which has a first and second radio base station apparatus that carry out coordinated multiple-point transmission with respect to a user terminal, and in which coordinated multiple-point transmission is applicable, and, with this retransmission control method, the first radio base station apparatus and the second radio base station apparatus execute retransmission control for downlink signals received in the user terminal, on a shared basis between the radio base station apparatuses, and one radio base station apparatus of the first radio base station apparatus and the second radio base station apparatus sends a report to the user (Continued)

terminal to the effect that shared retransmission control is executed.

3 Claims, 8 Drawing Sheets

(51) Int. Cl.
    *H04L 1/18*         (2006.01)
    *H04B 7/024*       (2017.01)
    *H04W 88/02*      (2009.01)
    *H04W 88/08*      (2009.01)

(56) References Cited

U.S. PATENT DOCUMENTS

2013/0121186 A1\* 5/2013 Vajapeyam ......... H04W 72/085
                                                                         370/252
2013/0215835 A1\* 8/2013 Chen ................. H04W 72/0406
                                                                         370/329

OTHER PUBLICATIONS

International Search Report for corresponding International Application No. PCT/JP2013/066695, mailed Sep. 10, 2013 (2 pages).
Office Action issued Jul. 5, 2016, in corresponding Japanese Patent Application No. 2012-170258 (with translation) (5 pages).

\* cited by examiner

RADIO COMMUNICATION SYSTEM, RADIO BASE STATION APPARATUS AND RETRANSMISSION CONTROL METHOD

TECHNICAL FIELD

The present invention relates to a radio communication system, a radio base station apparatus and a retransmission control method. More particularly, the present invention relates to a radio communication system, a radio base station apparatus and a retransmission control method to execute coordinated multiple-point (CoMP) transmission/reception.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In a third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of LTE are also under study, for the purpose of achieving further broadbandization and higher speed (for example, LTE-advanced ("LTE-A")).

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

In the LTE system (Rel-8), there is a technique to improve system performance even more, called "inter-cell orthogonalization." For example, in the LTE-A system (Rel-10), intra-cell orthogonalization is made possible by orthogonal multiple access on both the uplink and the downlink. That is to say, on the downlink, orthogonality is established between user terminals (user equipment) in the frequency domain. However, between cells, like in W-CDMA, interference randomization by one-cell frequency re-use is fundamental.

Also, in the 3GPP (3rd Generation Partnership Project), coordinated multiple-point transmission/reception (CoMP) is under study as a technique to realize inter-cell orthogonalization. According to CoMP techniques, a plurality of cells coordinate and perform signal processing for transmission and reception for one user terminal (UE) or for a plurality of user terminals (UEs).

Now, as a technique to cope with dynamic variations of channel quality, there is a scheduling technique to allocate data to radio resources effectively in accordance with channel quality. However, since channel quality varies randomly, it is not possible to adapt to momentary channel quality perfectly. Then, the hybrid ARQ technique (retransmission control technique) to request retransmissions of received data with errors is effective. In the LTE system, a retransmission of data with errors is first processed in the MAC (Medium Access Control) layer. It is expected to realize a highly efficient retransmission control method to adopt the above-described CoMP technique in the LTE-A system.

The present invention has been made in view of the above, and it is therefore an object of the present invention to provide a radio communication system, a radio base station apparatus and a retransmission control method that can realize a highly efficient retransmission control method in a CoMP environment.

Solution to Problem

The radio communication system of the present invention can employ coordinated multiple-point transmission and has a first radio base station apparatus and a second radio base station apparatus that carry out coordinated multiple-point transmission with respect to a user terminal, and, in this radio communication system, the first radio base station apparatus and the second radio base station apparatus execute retransmission control for downlink signals received in the user terminal, on a shared basis between the radio base station apparatuses, and one radio base station apparatus of the first radio base station apparatus and the second radio base station apparatus sends a report to the user terminal to the effect that shared retransmission control is executed.

The radio base station apparatus of the present invention provides a radio base station apparatus that coordinates with another radio base station apparatus and carries out coordinated multiple-point transmission with respect to a user terminal, and this radio base station apparatus has a retransmission control section configured to carry out retransmission control for downlink signals received in the user terminal, on a shared basis between the radio base station apparatuses, and a selection section configured to select a transmission point based on received quality information from the user terminal.

The retransmission control method of the present invention provides a retransmission control method in a radio communication system which has a first radio base station apparatus and a second radio base station apparatus that carry out coordinated multiple-point transmission with respect to a user terminal, and which can employ coordinated multiple-point transmission, and, in this retransmission control method, the first radio base station apparatus and the second radio base station apparatus execute retransmission control for downlink signals received in the user terminal, on a shared basis between the radio base station apparatuses, and one radio base station apparatus of the first radio base station apparatus and the second radio base station apparatus sends a report to the user terminal to the effect that shared retransmission control is executed.

Advantageous Effects of Invention

According to the present invention, it is possible to realize a highly efficient retransmission control method in a CoMP environment.

DESCRIPTION OF EMBODIMENTS

Figure 1A:
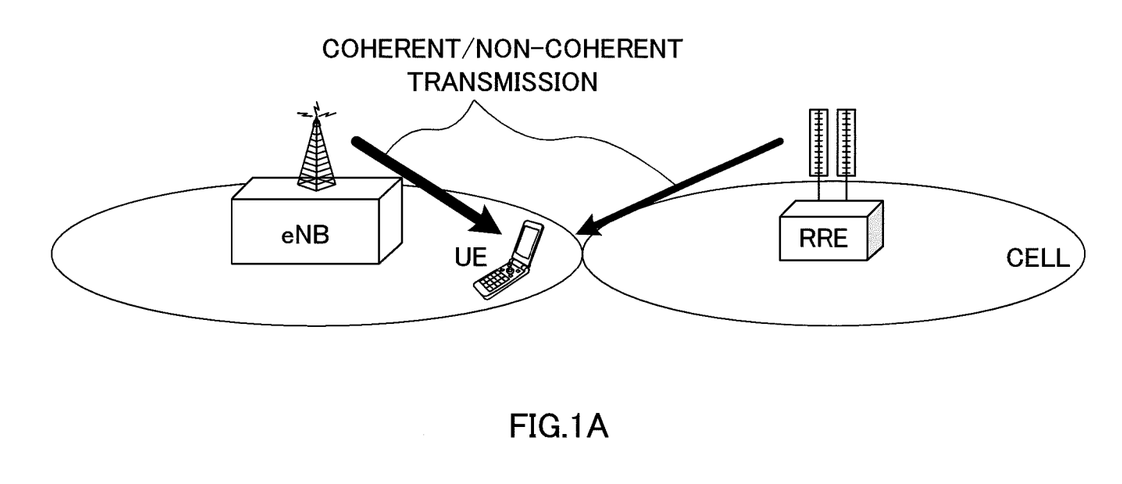
FIG. 1 provides diagrams to explain coordinated multiple points.
Figure 1B:
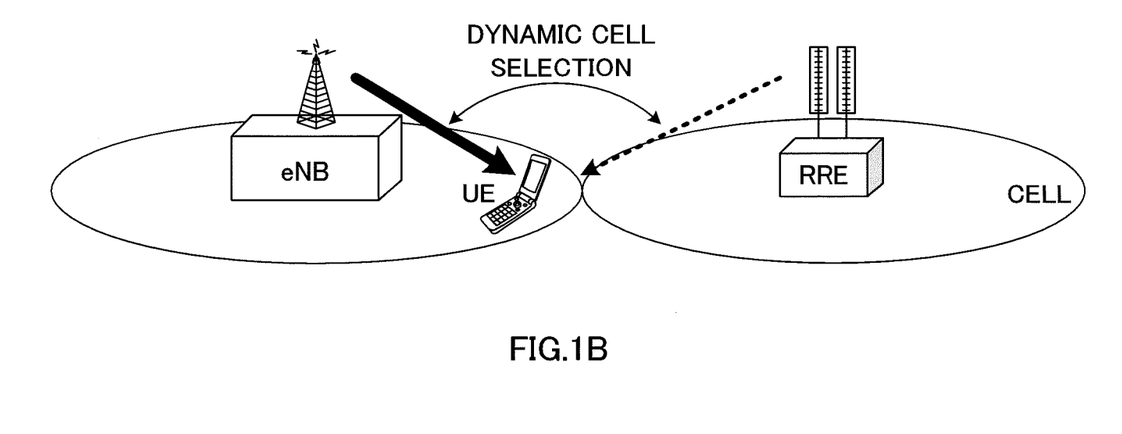

Now, an embodiment of the present invention will be described below in detail with reference to the accompanying drawings. First, downlink CoMP transmission will be described. Downlink CoMP transmission includes coordinated scheduling/coordinated beamforming, and joint processing. Coordinated scheduling/coordinated beamforming refers to a method of transmission from only one cell to one UE, and is a method to allocate radio resources in the frequency/space domain, taking into account interference from other cells and interference against other cells. Meanwhile, joint processing refers to simultaneous transmission by a plurality of cells applying precoding, and includes joint transmission (JT) to transmit from a plurality of cells to one UE, as shown in FIG. 1A, and dynamic point selection (DPS) to select cells dynamically as shown in FIG. 1B.

Figure 2A:
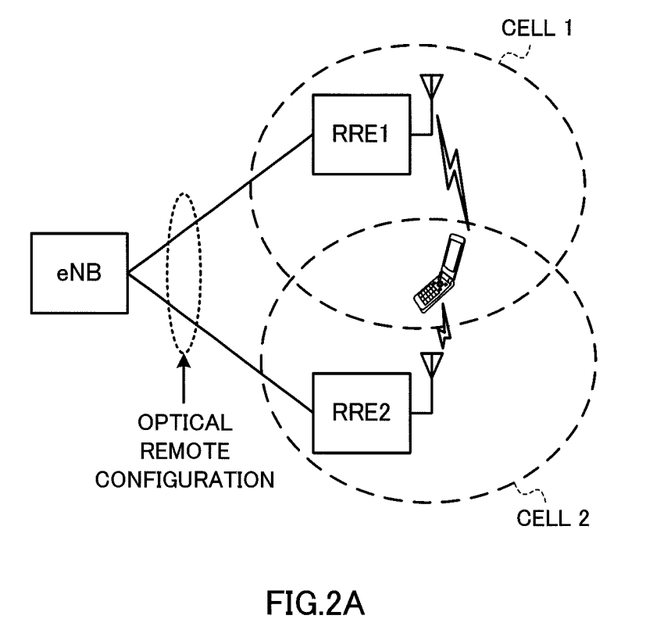
FIG. 2 provides diagrams to explain configurations of radio base station apparatuses.
Figure 2B:
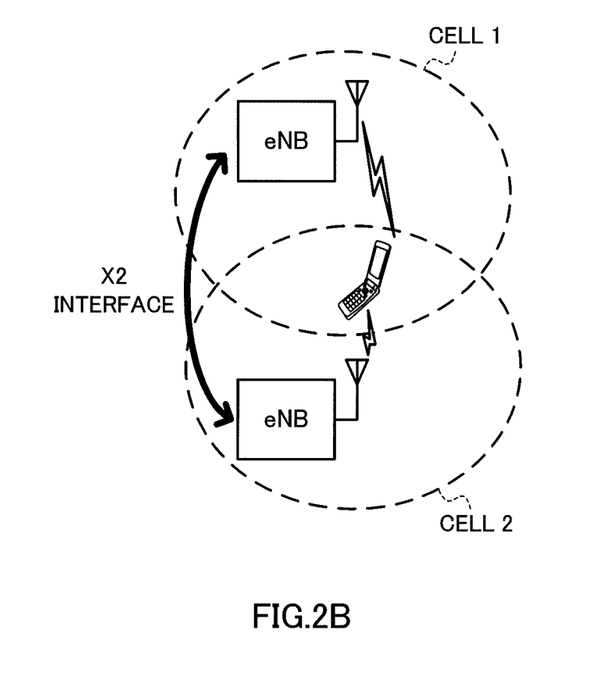

As for the configuration to implement CoMP transmission/reception, the cases shown in FIGS. 2A and 2B may be possible. FIG. 2A shows a configuration (centralized control based on remote radio equipment configuration) that includes a radio base station apparatus eNB and a plurality of remote radio equipment (RREs) that are connected with this radio base station apparatus eNB via optical remote configuration (optical fiber). FIG. 2B shows a configuration of a radio base station apparatus eNB (autonomous distributed control based on an independent base station configuration). The radio communication system according to the present embodiment is applicable to any of the above configurations.

In the configuration (RRE configuration) shown in FIG. 2A, remote radio equipment RRE 1 and RRE 2 (transmission points) are controlled in a centralized fashion in a radio base station apparatus eNB. In the RRE configuration, the radio base station apparatus eNB (central base station) that performs baseband signal processing and control for a plurality of RREs, and each cell (RRE) are connected by baseband signals using optical fiber. Consequently, it is possible to execute radio resource control between the cells in the central base station altogether. That is, the problems of signaling delay and overhead between radio base station apparatuses, which become problems in an independent base station configuration, are insignificant, and high-speed radio resource control between cells becomes comparatively easy. Consequently, in the RRE configuration, it is possible to apply a method to use fast signal processing between cells such as simultaneous transmission of a plurality of cells, to the downlink. The RREs are also radio base station apparatuses herein.

Meanwhile, in the configuration shown in FIG. 2B, a plurality of radio base station apparatuses eNB (or RREs) (transmission points) each perform radio resource allocation control such as scheduling. In this case, timing information and radio resource allocation information such as scheduling are transmitted to one radio base station apparatus, in accordance with need, using an X2 interface between the radio base station apparatus eNB of cell 1 and the radio base station apparatus eNB of cell 2, for coordination between the cells.

In an environment where above CoMP is employed—especially in an environment where DPS is employed—hybrid ARQ (HARQ) control is executed independently per transmission point. When HARQ control is executed per transmission point in this way, the following problems might arise.

FIG. 3 provides diagrams to explain retransmission control methods according to the present embodiment. Here, HARQ control in a DPS-CoMP environment where there are two transmission points (TP #0 and TP #1) will be described. In FIG. 3, subframes in which data has been transmitted are shown with diagonal lines, subframes which have been received in a user terminal without errors are shown with "○," subframes with which errors have been detected in the user terminal are shown with "×" and subframes where retransmissions have been made are shown with the symbol "R."

Figure 3A:
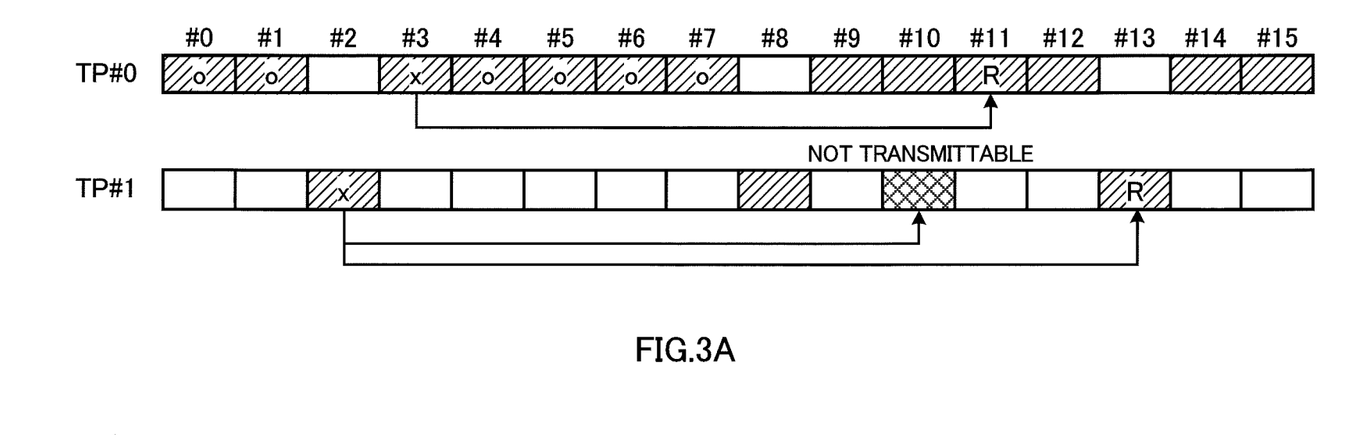
FIG. 3 provides diagrams to explain retransmission control methods according to the present embodiment.

As shown in FIG. 3A, in subframes #0 and #1, data is transmitted from transmission point TP #0 where the channel quality is good, and received in a user terminal without errors. In subframe #2, the channel quality of transmission point TP #1 gets well, so that the cell is switched and data is transmitted from transmission point TP #1. At this time, an error with the data is detected in the user terminal, and a retransmission is requested to the radio base station apparatus. Also, in subframe #3, the channel quality of transmission point TP #0 gets well, so that the cell is switched and data is transmitted from transmission point TP #0. At this time, the user terminal finds out that there is an error with the data, and requests a retransmission to the radio base station apparatus.

In this case, the retransmission packet from transmission point TP #0 is transmitted in subframe #11, which comes eight subframes after subframe #3. The momentary received quality in this subframe #11 is better in transmission point TP #0, so that the retransmission packet of transmission point TP #0 can be transmitted from transmission point TP #0. However, although a retransmission packet from transmission point TP #1 is transmitted in subframe #10 to come eight subframes after subframe #2, the momentary received quality in this subframe #10 is better in transmission point TP #0, which is the other transmission point, and therefore it is not possible to transmit the retransmission packet of transmission point TP #1 in subframe #10.

So, with the present invention, instead of executing retransmission control on a per transmission point basis, retransmission control for a plurality of transmission point is executed on a shared basis. With a first retransmission control method according to the present invention, when data is transmitted from different transmission points to the same user terminal, retransmission packets are transmitted when the momentary received quality increases and the transmission point is switched. That is, in FIG. 3A, the retransmission packet of transmission point TP #1 is transmitted in subframe #13, which comes after subframe #10 and in which the transmission point is switched. In other words, the retransmission packet of transmission point TP #1 is transmitted in a subframe which comes after the retransmission subframe position of a subframe in which an error is detected, and in the earliest subframe where transmission point TP #1 transmits. By executing retransmission control on a shared basis between transmission points in this way, it is possible to transmit retransmission packets when the momentary received quality in a user terminal is high.

Figure 3B:
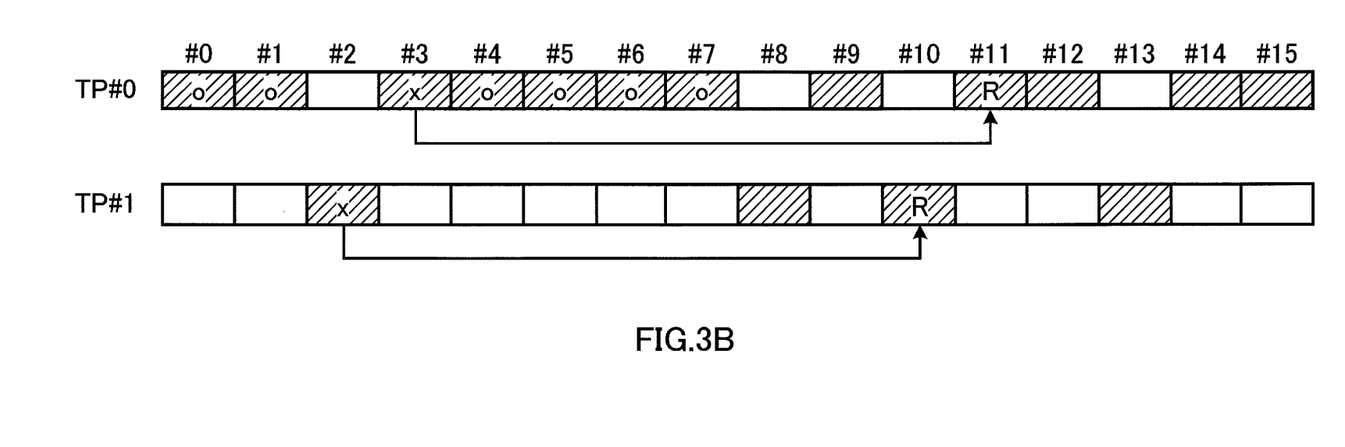

With a second retransmission control method according to the present invention, as shown in FIG. 3B, in a subframe desired to transmit a retransmission packet, the retransmission packet is transmitted forcibly, if data needs to be transmitted to the same user terminal from a different transmission point. That is, in FIG. 3B, the retransmission packet of transmission point TP #1 is forcibly transmitted in subframe #10. At this time, in transmission point TP #0, data is not transmitted despite the fact the momentary received quality is better than in transmission point TP #1. By executing retransmission control on a shared basis between transmission points in this way, it is possible to transmit retransmission packets without delay.

Execution of these retransmission control methods (executing retransmission control on a shared basis) is reported from the radio base station apparatus to the user terminal. For example, this report may be sent by means of higher layer signaling such as broadcast signals and RRC signaling, by transmitting downlink control information, and so on. This report may also pertain to information that the shared retransmission control is applied or concern the times to receive retransmission packets in the CoMP environment, and may be reported to the user terminal in advance. The user terminal receives the report from the radio base station apparatus, and, upon entering the CoMP environment, receives retransmission packets according to the first method or the second method above. Note that whether or not the system enters CoMP control is also reported from the radio base station apparatus to the user terminal through higher layer signaling.

With the present embodiment, in a plurality of radio base station apparatuses, retransmission control for downlink signals received in a user terminal is executed on a shared basis between the radio base station apparatuses, so that one radio base station apparatus among the plurality of radio base station apparatuses sends a report to the effect that shared retransmission control is executed, to the user terminal. For example, when CoMP (DPS) control is executed in two radio base station apparatuses, if the first radio base station apparatus and the second radio base station apparatus have processing sections that control the transmission processes for cell #1 and cell #2, respectively, the first radio base station apparatus and the second radio base station apparatus share a retransmission control section 22, which controls downlink signal retransmissions. Meanwhile, a configuration is assumed here in which mapping sections 26 to map downlink signals such as downlink control signals, downlink data signals and reference signals to radio resources are provided separately on a per cell basis (see FIG. 4). In this case, a report to the effect that retransmission control is executed on a shared basis is reported to the user terminal by means of higher layer signaling and so on.

Figure 4:
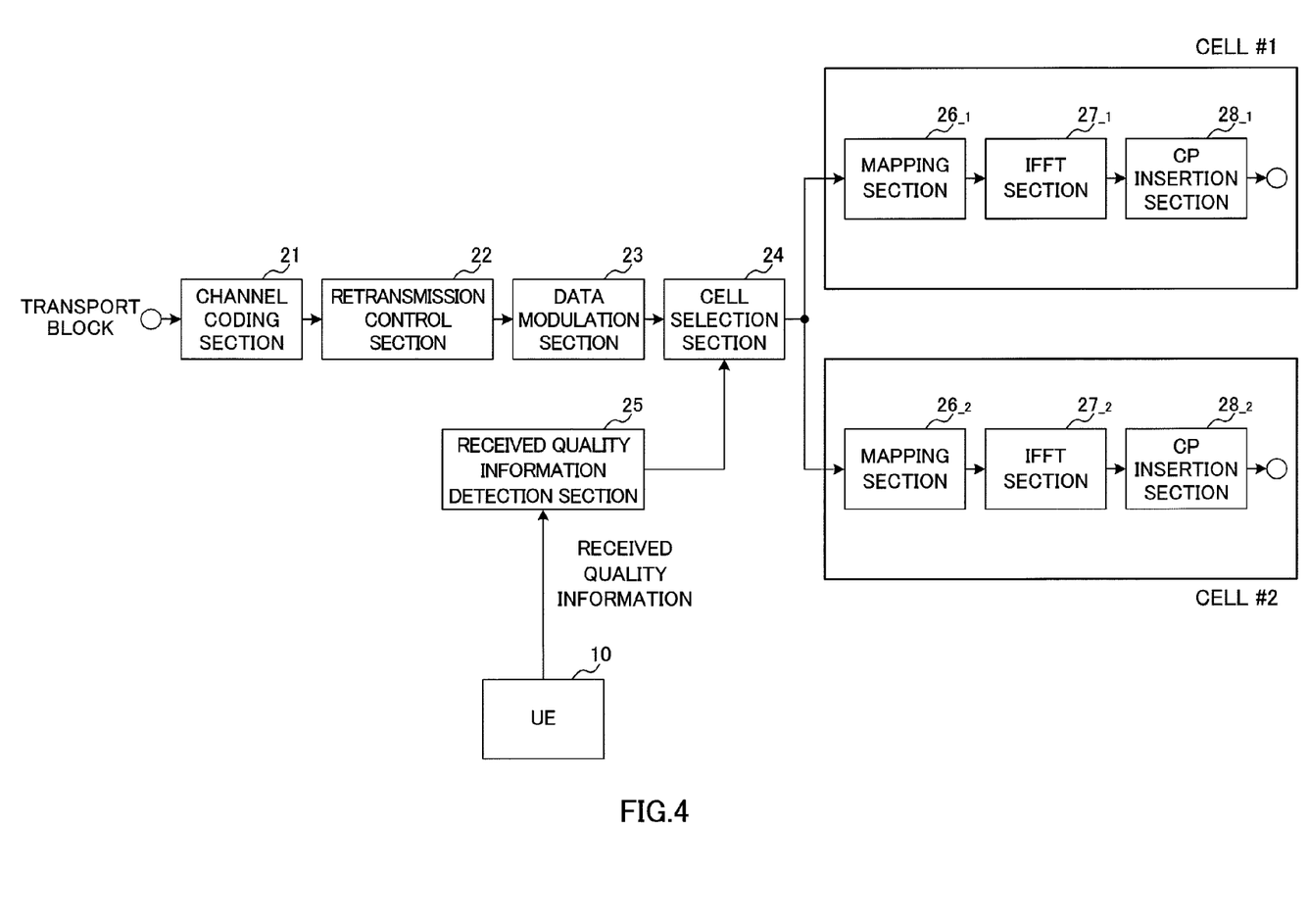
FIG. 4 is a diagram to explain transmission processing sections in each cell according to the present embodiment.

By sharing the retransmission control section 22 between the cells, it is possible to transmit retransmission signals generated in the retransmission control section 22 from either the cell (cell #1) of the first radio base station apparatus or the cell (cell #2) of the second radio base station apparatus. By this means, centralized retransmission control is made possible, so that retransmission packets (retransmission signals) can be transmitted with high efficiency under the CoMP environment.

Also, with the present embodiment, as shown in FIG. 4, configurations that require different processes per cell, such as the mapping sections 26 that map downlink control signals, are provided separately on a per cell basis, instead of sharing all the transmission processes between different cells.

Examples of signals multiplexed in the mapping sections 26 include data signals (the PDSCH (Physical Downlink Shared Channel)), the PDCCH signal that reports allocation information of the PDSCH, the PUSCH (Physical Uplink Shared Channel) and so on, control signals such as the PCFICH (Physical Control Format Indicator Channel) that reports CFI (Control channel Format Indicator) values, which mean the number of downlink control channel symbols, for realizing highly efficient transmission, the PHICH (Physical Hybrid ARQ Indicator Channel) that reports ACK/NACK information for the uplink, and reference signals such as CRSs (Cell-specific Reference Signals), DM-RSs (Demodulation Reference Signals), CSI-RSs (Channel State Information Reference Signals) and so on.

Downlink control signals (for example, the PDCCH signal) are mapped to radio resources and transmitted, and are allocated to the first one to three OFDM symbols in a subframe, depending on the communication environment. Cell-specific reference signals (CRSs and so on) are also arranged in the first one to three OFDM symbols in a subframe. Consequently, the mapping positions of downlink control signals change in each subframe, depending on the communication environment, and also vary per cell. Also, as for the reference signals, such as CRSs, DM-RSs, CSI-RSs and so on, which are cell-specific reference signals, are multiplexed in subframes. For example, as with CRSs, the multiplexing positions of CRSs are determined by cell ID (identification), so that there is a possibility that the multiplexing positions vary in each cell. Consequently, the first radio base station apparatus and the second radio base station apparatus have mapping sections separately, per cell, and execute control in cell units.

Note that, although the retransmission control section 22 and the mapping sections 26 have been shown with the above description, as shown in FIG. 4, it is equally possible to design a configuration in which the transport block, channel coding section 21, data modulation section 23 and so on are also shared between cells and their processes are executed on a shared basis. On the other hand, it is also possible to design a configuration providing and controlling IFFT sections 27 to perform the IFFT, which is a process after mapping, and CP insertion sections 28 to attach CPs, separately, on a per cell basis.

The transmission processing sections (for example, the retransmission control section 22, the transport block, the channel coding section 21, the data modulation section 23 and so on) to be shared between cells may be designed to be provided in one of the first radio base station apparatus (cell #1) and the second radio base station apparatus (cell #2) or may be designed to be provided in both. In the case the retransmission control section 22 and so on are provided in both radio base station apparatuses, only the processes themselves have to be controlled on a shared basis between different cells.

Also, when the dynamic cell section method (DPS) is employed as coordinated multiple-point transmission, the first radio base station apparatus or the second radio base station apparatus carries out mapping with respect to predetermined cells where transmission is commanded, based on received quality information (each cell's CSI) transmitted from a user terminal 10. For example, the first radio base station apparatus or the second radio base station apparatus has a received quality information detection section 25 that detects the received quality of transmission from the user terminal 10, and a cell selection section 24 that selects a cell to map downlink signals to, based on information about this received quality. The cell selection section 24 commands execution of mapping to a cell (cell #1 or cell #2) where the received SINR is high, using received SINR (Signal to Interference plus Noise Ratio) information that is reported from the user terminal 10.

In this configuration, in the case where, at the time a retransmission signal of a downlink signal that has been transmitted from the first radio base station apparatus to the user terminal is transmitted, the second radio base station apparatus transmits a signal to the user terminal, the retransmission signal is transmitted when the transmission point is switched to the first radio base station apparatus (the first method (FIG. 3A)). Alternatively, even when the second radio base station apparatus transmits a signal to the user terminal at the time a retransmission signal of a downlink signal that has been transmitted from the first radio base station apparatus to the user terminal is transmitted, the retransmission signal is transmitted from the first radio base station apparatus (the second method (FIG. 3B)).

In this way, with the present embodiment, by designing a configuration in which the retransmission control section is shared between cells, it is possible to realize highly efficient retransmission control under the CoMP environment. Note that, although an example with two radio base station apparatuses has been shown with the above description, the present invention is by no means limited to this, and it is equally possible to execute retransmission control among three or more radio base station apparatuses on a shared basis.

Now, a radio communication system 1 formed with user terminals 10 and radio base station apparatuses 20 will be described below with reference to FIG. 5. The user terminals 10 and the radio base station apparatuses 20 support LTE-A.

Figure 5:
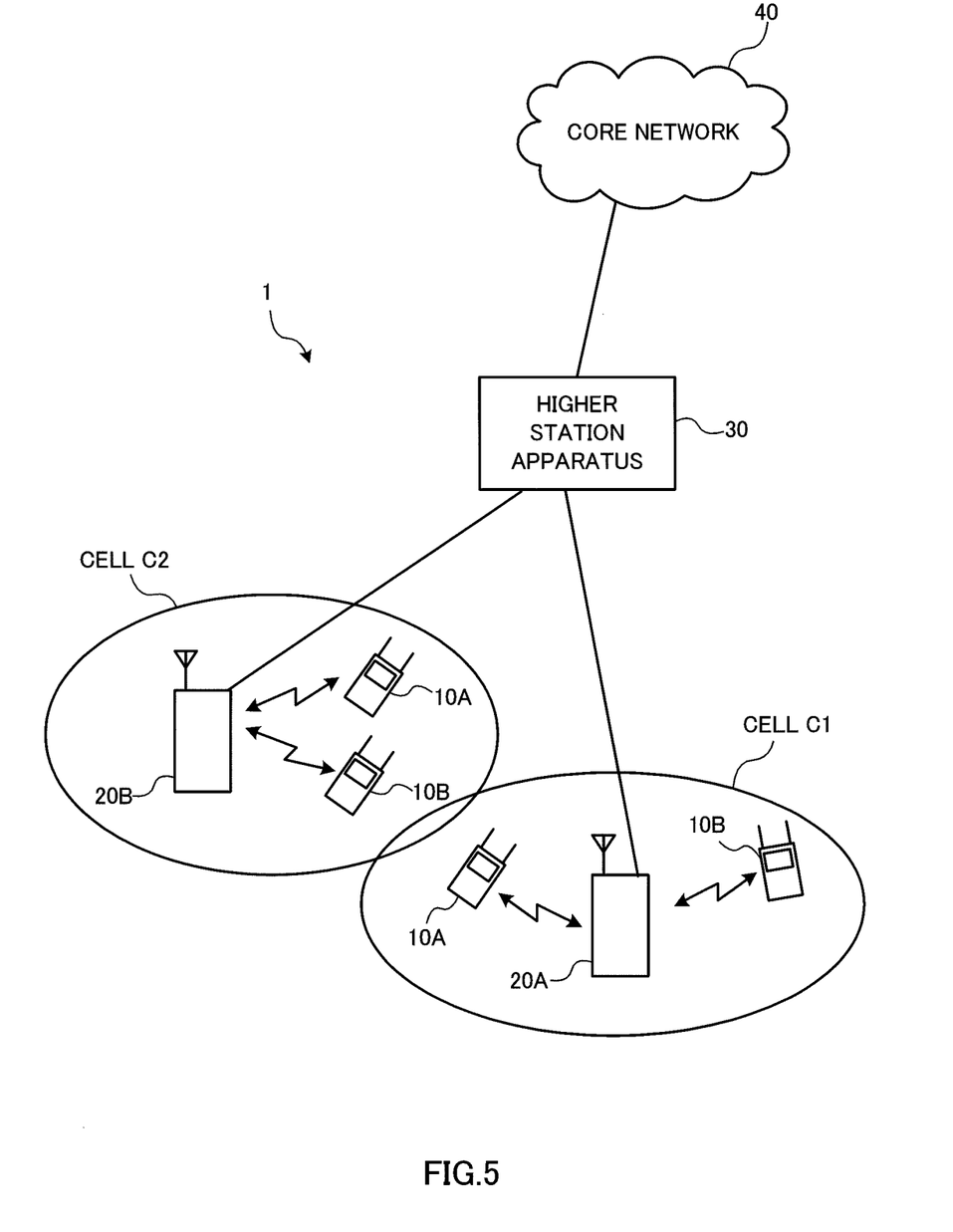
FIG. 5 is a diagram to explain a system configuration of a radio communication system according to the present embodiment.

As shown in FIG. 5, the radio communication system 1 is configured to include radio base station apparatuses 20A and 20B, and a plurality of user terminal 10A and 10B that communicate with these radio base station apparatuses 20A and 20B. The radio base station apparatuses 20A and 20B are connected with a higher station apparatus 30, and this higher station apparatus 30 is connected with a core network 40. Also, the radio base station apparatuses 20A and 20B are connected with each other by wire connection or by wireless connection.

Also, in the radio communication system 1, the first radio base station apparatus 20A and the second radio base station apparatus 20B perform coordinated multiple-point transmission, to the user terminals 10A and 10B, between cells of the same frequency band (cell C1 and cell C2). Between the cell C1 and the cell C2, the coverage areas overlap at least in part, or the coverage area of one includes the coverage area of the other.

The user terminals 10A and 10B can communicate with the radio base station apparatuses 20A and 20B in the cells C1 and C2. Note that the higher station apparatus 30 may be, for example, an access gateway apparatus, a radio network controller (RNC), a mobility management entity (MME) and so on, but is by no means limited to these.

Although the user terminals 10A and 10B may be either LTE terminals or LTE-A terminals, the following description will be given simply with respect to user terminals, unless specified otherwise.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. Note that the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channel configurations defined in LTE-A will be described. Downlink communication channels include a downlink data channel (PDSCH) that is shared between the user terminal 10A and 10B, and downlink L1/L2 control channels (PDCCH, PCFICH, PHICH). Downlink data and higher control signals are transmitted by the PDSCH. PDSCH and PUSCH scheduling information and so on (downlink control information) are transmitted by the PDCCH. The number of OFDM symbols to use for the PDCCH is transmitted by the PCFICH. HARQ ACK/NACK for the PUSCH are transmitted by the PHICH.

Uplink communication channels include a PUSCH, which is shared by each user terminal as an uplink data channel, and a PUCCH (Physical Uplink Control Channel), which is an uplink control channel. By means of this PUSCH, transmission data and higher control information are transmitted. Furthermore, downlink channel quality information (CQI), ACK/NACK and so on are transmitted by the PUCCH.

Figure 6:
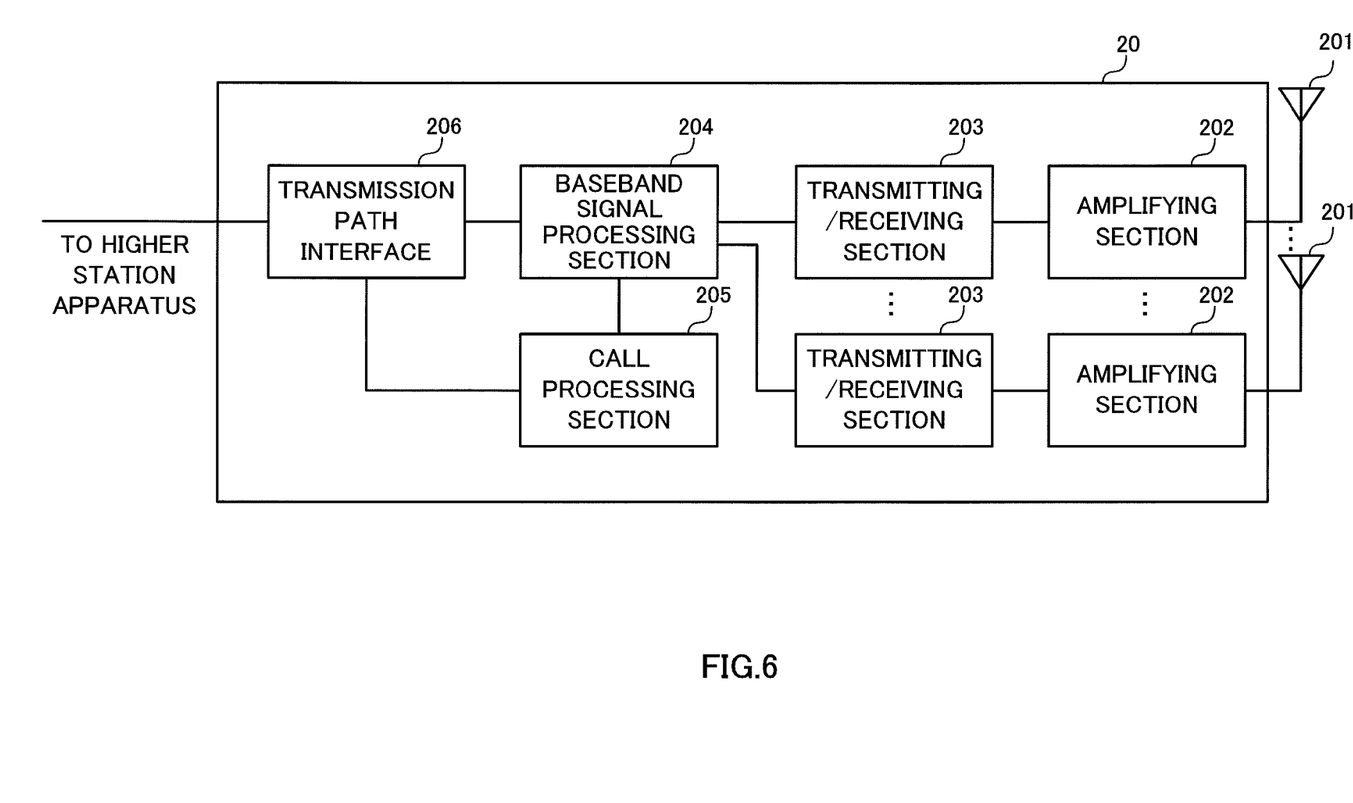
FIG. 6 is a functional block diagram to show an overall configuration of a radio base station apparatus according to the present embodiment.

Next, an overall configuration of a radio base station apparatus 20 according to the present embodiment will be explained with reference to FIG. 6. Note that the first radio base station apparatus 20A and the second radio base station apparatus 20B can assume the same overall configuration, and therefore will be described as "radio base station apparatus 20." Also, since the user terminals 10A and 10B are also configured alike, these will be described as "user terminal 10."

The radio base station apparatus 20 has a plurality of transmitting/receiving antennas 201, a plurality of amplifying sections 202, a plurality of transmitting/receiving sections 203, a baseband signal processing section 204, a call processing section 205 and a transmission path interface 206. Transmission data to be transmitted from the radio base station apparatus 20 to the user terminal 20 on the downlink is input from the higher station apparatus 30, into the baseband signal processing section 204, via the transmission path interface 206.

In the baseband signal processing section 204, the downlink data channel signal is subjected to a PDCP (Packet Data Convergence Protocol) layer process, division and coupling of transmission data, RLC (Radio Link Control) layer transmission processes such as an RLC retransmission control transmission process, MAC retransmission control, including, for example, a retransmission control (HARQ) transmission process, scheduling, transport format selection, channel coding, an inverse fast Fourier transform (IFFT) process, and a precoding process. Furthermore, the signal of the physical downlink control channel, which is a downlink control channel, is also subjected to transmission processes such as channel coding and an inverse fast Fourier transform.

Also, the baseband signal processing section 204 reports control information for allowing each user terminal 10 to perform radio communication with the radio base station apparatus 20, to the user terminals 10 connected to the same cell, by a broadcast channel. The information for allowing communication in the cell includes, for example, the uplink or downlink system bandwidth, root sequence identification information (root sequence indices) for generating random access preamble signals in the PRACH (Physical Random Access Channel), and so on.

The transmitting/receiving sections 203 convert the baseband signals, which have been pre-coded and output from the baseband signal processing section 204 on a per antenna basis, into a radio frequency band. The amplifying sections 202 amplify the radio frequency signals having been subjected to frequency conversion, and output the resulting signals through the transmitting/receiving antennas 201. Note that the transmitting/receiving sections 203 constitute a receiving section that receives candidate CoMP cell information and a transmission control section that transmits transmission power information, CoMP cell information, neighboring cell information, and also transmits transmission signals in CoMP transmission.

Meanwhile, as for data to be transmitted from the user terminal 10 to the radio base station apparatus 20 on the uplink, radio frequency signals received in the transmitting/receiving antennas 201 are amplified in each amplifying section 202, converted into baseband signals through frequency conversion in each transmitting/receiving section 203, and input in the baseband signal processing section 204.

The baseband signal processing section 204 applies an FFT (Fast Fourier Transform) process, an IDFT (Inverse Discrete Fourier Transform) process, error correction decoding, a MAC retransmission control receiving process, and RLC layer and PDCP layer receiving processes, to the transmission data included in the base signals received as input. The decoded signals are transferred to the higher station apparatus 30 through the transmission path interface 206. The call processing section 205 performs call processing such as setting up and releasing communication channels, manages the state of the radio base station apparatus 20 and manages the radio resources.

Figure 7:
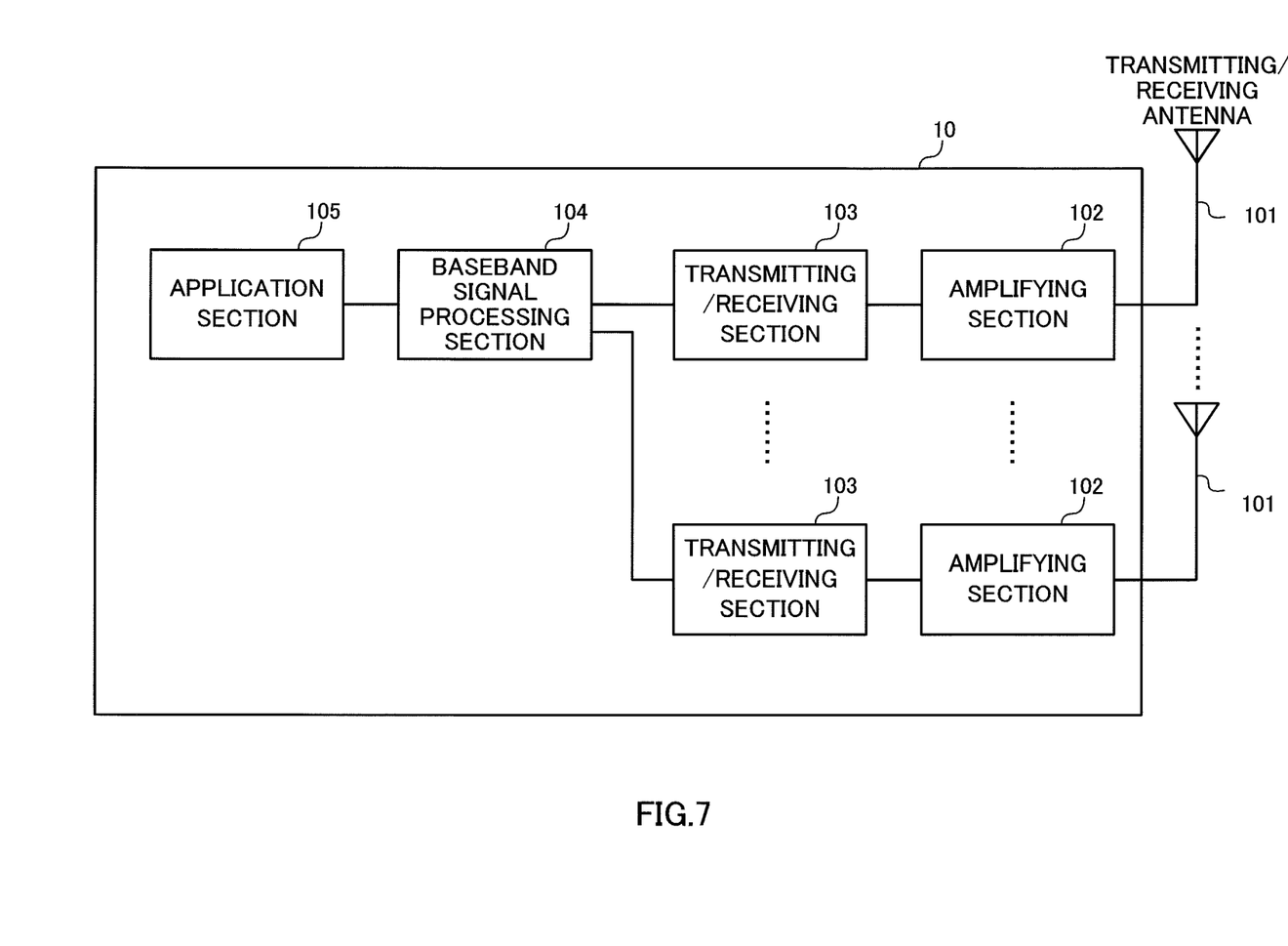
FIG. 7 is a functional block diagram to show an overall configuration of a user terminal according to the present embodiment.

Next, an overall configuration of a user terminal according to the present embodiment will be described with reference to FIG. 7. An LTE terminal and an LTE-A terminal have the same hardware configurations in principle parts, and therefore will be described indiscriminately. A user terminal 10 has a plurality of transmitting/receiving antennas 101, a plurality of amplifying sections 102, a plurality of transmitting/receiving sections 103, a baseband signal processing section 104 and an application section 105.

As for downlink data, radio frequency signals that are received in the plurality of transmitting/receiving antennas 101 are each amplified in the amplifying sections 101, and subjected to frequency conversion and converted into baseband signals in the transmitting/receiving sections 103. The baseband signals are subjected to an FFT process, error correction decoding, a retransmission control receiving process and so on in the baseband signal processing section 104. In this downlink data, downlink user data is transferred to the application section 105. The application section 105 performs processes related to higher layers above the physical layer and the MAC layer, and so on. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT (Discrete Fourier Transform) process, and an IFFT process. Also, the process to generate each cell's received quality information to report to the radio base station apparatus 20 is executed. The baseband signals that are output from the baseband signal processing section 104 are converted into a radio frequency band in the transmitting/receiving sections 103. After that, the signals are amplified in the amplifying sections 102 and transmitted from the transmitting/receiving antennas 101.

Figure 8:
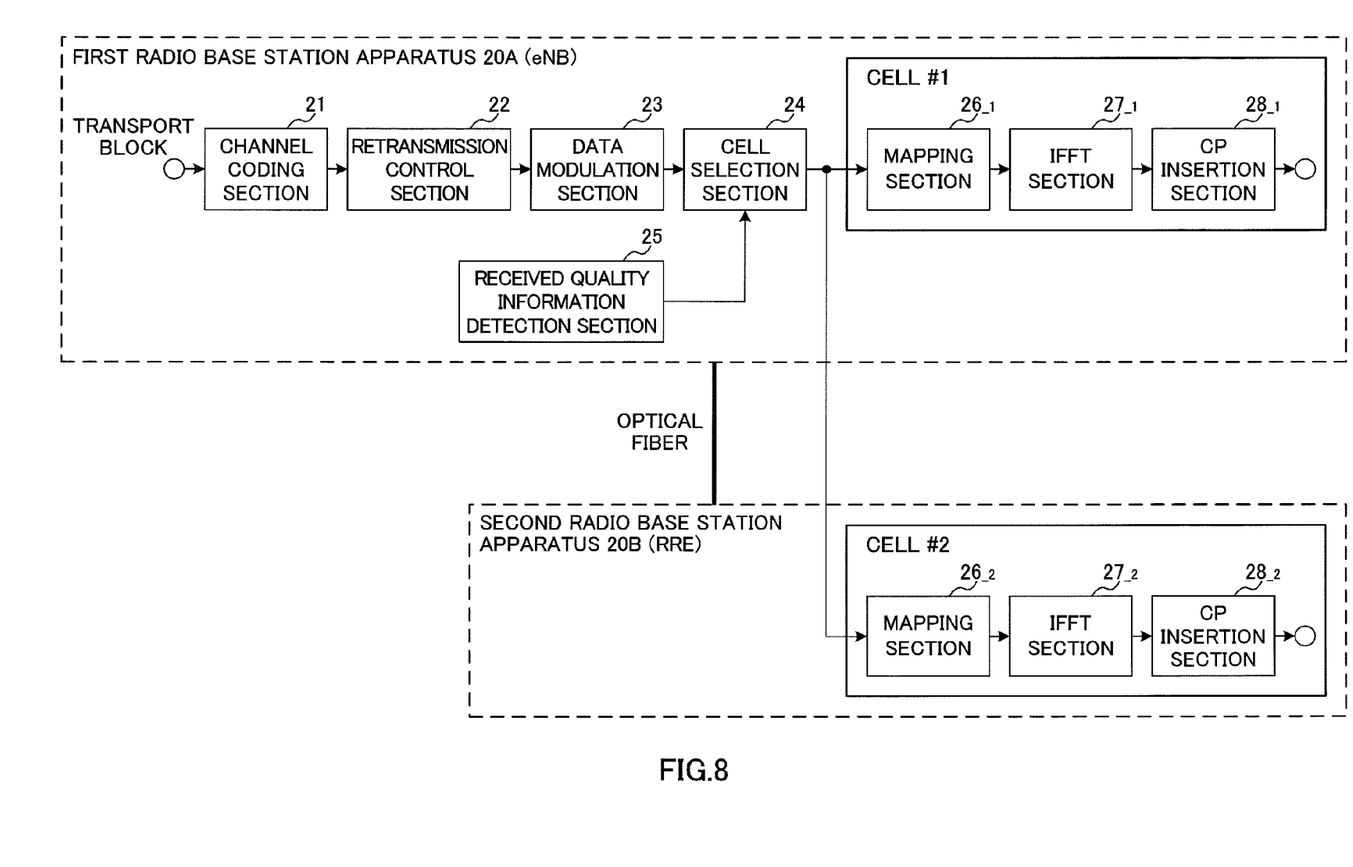
FIG. 8 is a functional block diagram to show a baseband processing section in a radio base station apparatus according to the present embodiment.

FIG. 8 is a functional block diagram of the baseband signal processing section 204 provided in the first radio base station apparatus 20A and the second radio base station apparatus 20B according to the present embodiment, and primarily shows the function blocks in the baseband signal processing section 204 pertaining to transmission processes.

Note that, in FIG. 8, as an example, the first radio base station apparatus 20A (eNB) and the second radio base station apparatus 20B (RRE) are shown as an example of performing data transmission by means of optical remote configuration. Also, a case is shown here where the first radio base station apparatus 20A and the second radio base station apparatus 20B perform CoMP transmission/reception between cells of the same frequency band (cell #1 and cell #2). Obviously, the number of radio base station apparatuses 20 and the number of cells each radio base station apparatus uses are not limited to these.

The first radio base station apparatus 20A (cell #1) and the second radio base station apparatus 20B (cell #2) carry out transport block generation, retransmission control and data modulation on a shared basis. Also, the mapping, the IFFT process, and the insertion of CPs for downlink control signals are controlled separately in each cell.

FIG. 8 shows a case where the channel coding section 21, the retransmission control section 22 and the data modulation section 23 are provided only in the first radio base station apparatus 20A, and where the mapping sections 26, the IFFT sections 27, the CP insertion sections 28 are provided in both the first radio base station apparatus 20A and the second radio base station apparatus 20B. Obviously, it is equally possible to provide the channel coding section 21, the retransmission control section 22 and the data modulation section 23 in both of the first radio base station apparatus 20A and the second radio base station apparatus 20B, and control their processes on a shared basis between different cells.

The channel coding section 21, for example, performs channel coding of the downlink shared data channel (PDSCH) on a per user basis. The retransmission control section 22 generates retransmission control signals (ACK/NACK) in response to uplink signals transmitted from the user terminal 10. The data modulation section 23 modulates the user data and so on having been subjected to channel coding, on a per user basis.

The mapping sections 26 map the modulated user data, downlink control signals and so on to radio resources. The IFFT sections 27 perform an inverse fast Fourier transform of the input signals and convert the signals from frequency domain signals to time sequence signals. The CP insertion sections 28 insert cyclic prefixes in the time sequence signals of the downlink control signals. Note that the cyclic prefixes function as guard intervals for cancelling differences in multipath propagation delay. The transmission data, to which cyclic prefixes have been added, is transmitted to the above transmitting/receiving sections 203.

Also, the first radio base station apparatus 20A has a cell selection section 24 that selects the cells to map downlink control signals and so on to, when the dynamic cell section method (DPS) is applied as coordinated multiple-point transmission. The cell selection section 24 detects received quality information (each cell's CSI) transmitted from the user terminal 10 in the received quality information detection section 25, and selects adequate cells based on that received quality information.

Now, a case will be described below where, in the radio communication system, CoMP transmission is executed with respect to the user terminal 10 between the first radio base station apparatus 20A (cell #1) and the second radio base station apparatus 20B (cell #2).

First, by way of higher layer signaling, the first radio base station apparatus 20A reports to the user terminal 10 that that the first radio base station apparatus 20A and the second radio base station apparatus 20B are entering DPS-CoMP mode.

As shown in FIG. 3A, in a given transmission period (subframe #0), the received quality in cell #1 is high, so that the cell selection section 24 selects cell #1. By this means, the first radio base station apparatus 20A (transmission point TP #0) transmits data to the user terminal 10. In subframe #1, too, the first radio base station apparatus 20A (transmission point TP #0) transmits data to the user terminal 10. In subframe #2, the received quality in cell #2 is high, so that the cell selection section 24 selects cell #2. By this means, the second radio base station apparatus 20B (transmission point TP #1) transmits data to the user terminal 10. In subframe #3, the received quality in cell #1 is high, so that the cell selection section 24 selects cell #1. By this means, the first radio base station apparatus 20A (transmission point TP #0) transmits data to the user terminal 10.

Although the transmission packets of subframes #0 and #1 are received in the user terminal 10 without errors and so an ACK is fed back, the transmission packets of subframes #2 and #3 are detected to have errors in the user terminal 10, and so a NACK is fed back. At this time, the retransmission control 22 controls the retransmission packet of transmission point TP #0 to be transmitted in subframe #12, which comes eight subframes later, and, as for the retransmission packet of transmission point #1, the retransmission control section 22 transmits the retransmission packet of transmission point TP #1 in subframe #14, which comes after subframe #11 and in which the transmission point is switched (the first method). By executing retransmission control on a shared basis between transmission points in this way, it is possible to transmit retransmission packets when the momentary received quality in the user terminal is high.

Also, the retransmission control section 22 controls the retransmission packet of transmission point TP #0 to be transmitted in subframe #12, which comes eight subframes after subframe #3, and also controls the retransmission packet of transmission point TP #1 to be transmitted in subframe #11, which comes eight subframes after subframe #2. By executing retransmission control on a shared basis between transmission points in this way, it is possible to transmit retransmission packets without delay.

The radio base station apparatus sends a report to the user terminal when a retransmission control method like this is used (that is, a report to the effect that shared retransmission control is executed). For example, this report may be sent by means of higher layer signaling such as broadcast signals and RRC signaling, by transmitting downlink control information, and so on.

Note that, although FIG. 8 shows a case where the configuration shown in FIG. 2A above (centralized control based on a remote radio equipment configuration) is adopted, where the first radio base station apparatus 20A is the radio base station apparatus eNB and the second radio base station apparatus 20B is remote radio equipment (RRE), obviously, the present embodiment may as well assume the configuration shown in FIG. 2B above (autonomous distributed control based on an independent base station configuration). For example, it is possible to connect the first radio base station apparatus 20A and the second radio base station apparatus 20B as radio base station apparatuses eNB by means of an X2 interface. In this case, referring to FIG. 8, it is possible to design a configuration to provide the channel coding section 21, the retransmission control section 22 and the data modulation section 23 in both of the first radio base station apparatus 20A and the second radio base station apparatus 20B, and control their functions on a shared basis between different cells via the X2 interface.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-170258, filed on Jul. 31, 2012, including the specification, drawings and abstract, is incorporated herein by reference in its entirety.

The invention claimed is:

1. A radio communication system where coordinated multiple-point transmission is applicable, comprising a first radio base station apparatus and a second radio base station apparatus that carry out coordinated multiple-point transmission with respect to a user terminal, wherein:
   the radio communication system employs a dynamic point selection (DPS) to select the first radio base station apparatus or the second radio base station apparatus as a transmission point of a downlink signal based on received quality information;
   when the second radio base station apparatus is selected as the transmission point in a subframe for transmitting a retransmission signal of the downlink signal the first radio base station apparatus, the first radio base station apparatus waits for transmission of the retransmission signal until the transmission point is switched from the second radio base station apparatus to the first radio base station apparatus;
   transmitting by the first base station apparatus the retransmission signal after the transmission point is switched; and the waiting for the transmission of the retransmission signal by the first radio base station is signaled to the user terminal by higher layer signaling.

2. A first radio base station apparatus that coordinates with a second radio base station apparatus and carries out coordinated multiple-point transmission with respect to a user terminal, the first radio base station apparatus comprising:

a transmitter that transmits a downlink signal to the user terminal when the first radio base station is selected by a dynamic point selection (DPS) as a transmission point of a downlink signal based on received quality information;

a processor that carries out retransmission control for the downlink signal, wherein, when the second radio base station apparatus is selected as the transmission point in a subframe for transmitting a retransmission signal of the downlink signal by the first radio base station, the processor waits for transmission of the retransmission signal until the transmission point is switched from the second radio base station apparatus to the first radio base station apparatus; wherein the transmitter further configured to transmit the retransmission signal after the transmission point is switched; and wherein the waiting for the transmission of the retransmission signal by the first radio base station apparatus is signaled to the user terminal by higher layer signaling.

3. A retransmission control method in a radio communication system which comprises a first radio base station apparatus and a second radio base station apparatus that carry out coordinated multiple-point transmission with respect to a user terminal, and in which coordinated multiple-point transmission is applicable, wherein:

the method comprising:

selecting by a dynamic point selection (DPS) the first radio base station apparatus or the second radio base station apparatus as a transmission point of a downlink signal based on received quality information;

when the second radio base station apparatus is selected as the transmission point in a subframe for transmitting a retransmission signal of the downlink signal by the first radio base station apparatus, the first radio base station apparatus waits for transmission of the retransmission signal until the transmission point is switched from the second radio base station apparatus to the first radio base station apparatus; transmitting by the first base station apparatus the retransmission signal after the transmission point is switched; and wherein the waiting for the transmission of the retransmission signal by the first radio base station apparatus is signaled to the user terminal by higher layer signaling.

* * * * *